June 23, 1931.   K. PRÖNNECKE   1,811,559
MACHINE FOR MAKING CLOTHES PEGS
Filed Sept. 15, 1930   2 Sheets-Sheet 1
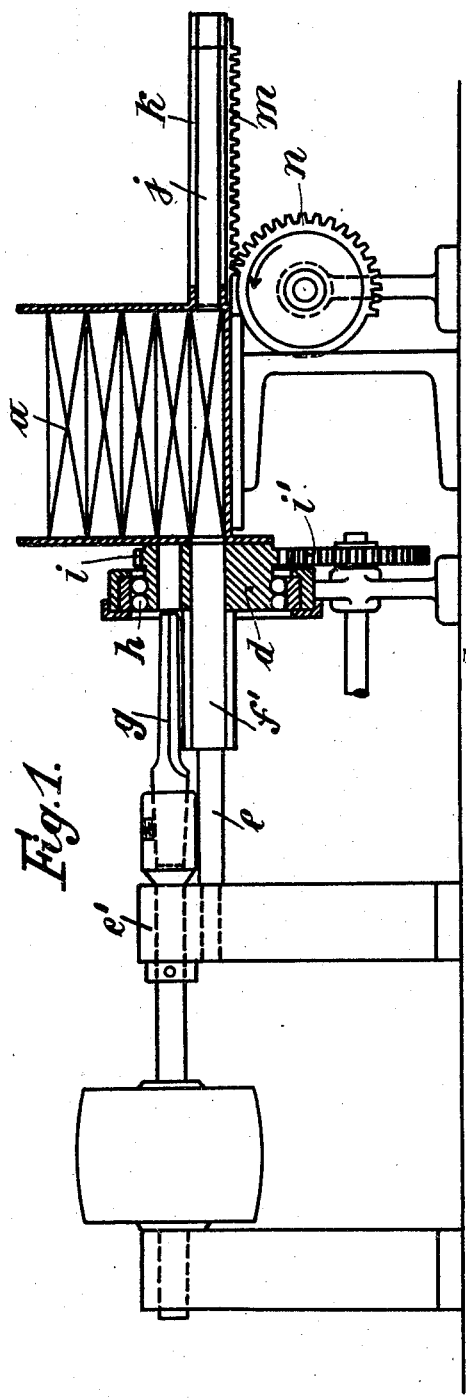
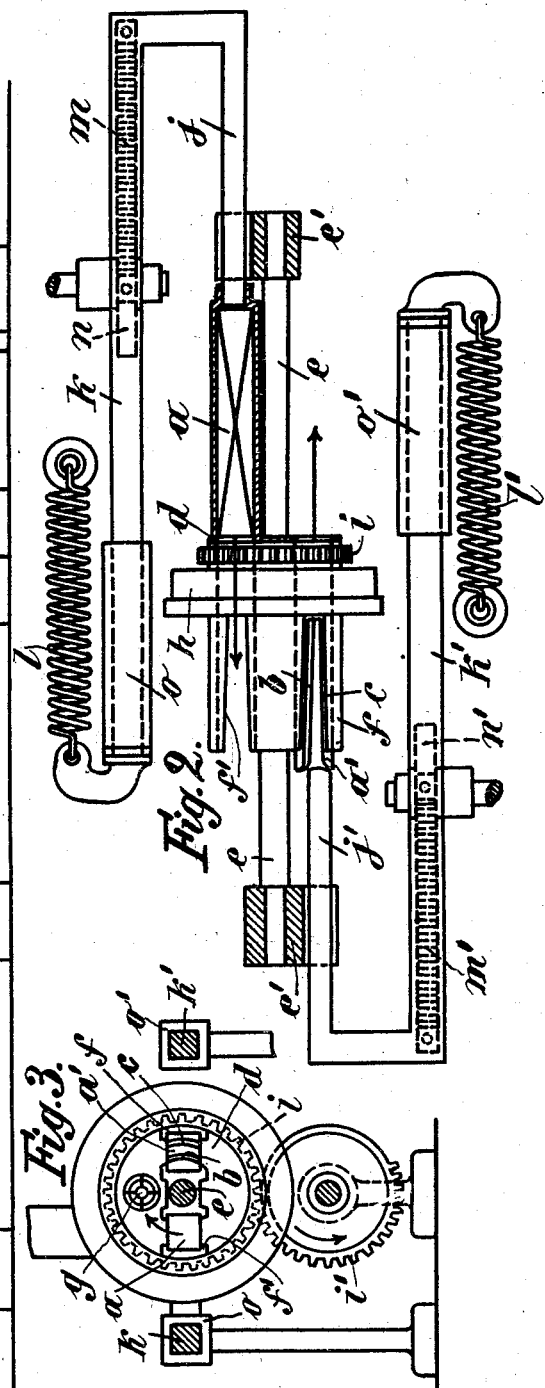
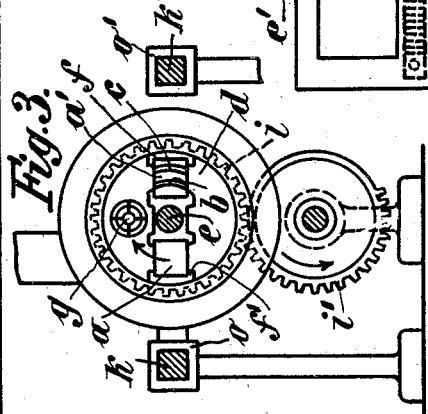
Inventor:
Karl Prönnecke

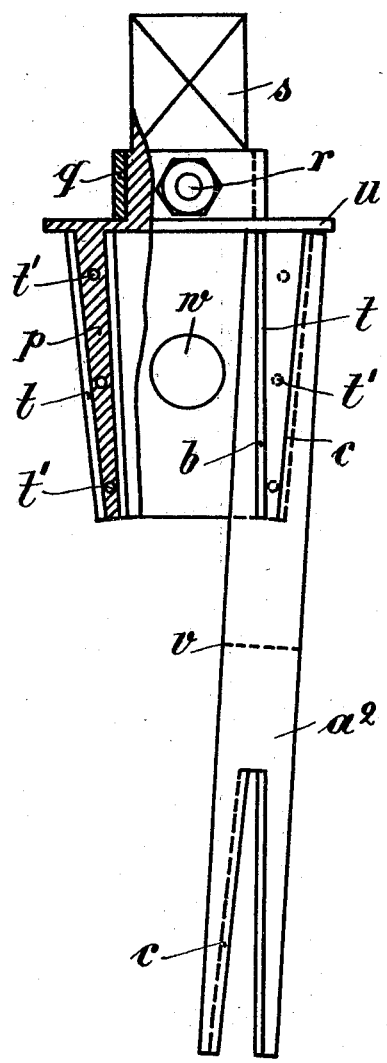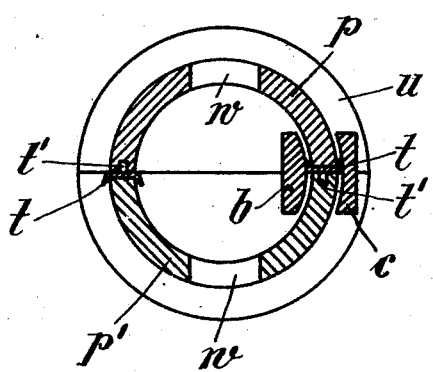

Patented June 23, 1931

1,811,559

UNITED STATES PATENT OFFICE

KARL PRÖNNECKE, OF QUEDLINBURG, HARZ, GERMANY

MACHINE FOR MAKING CLOTHES PEGS

Application filed September 15, 1930, Serial No. 481,955, and in Germany November 27, 1929.

This invention relates to a machine for making clothes pegs, one arm of which is provided on the inner side with a raised curved surface and the other with a cavity. In the new machine two carriage guides for the peg blanks are arranged eccentrically to a drum, which carriages, during the rotation of the drum, are fed past a coned milling cutter, which, as the peg blank is passing by, mills the raised curve on the one peg arm and the cavity in the other peg arm. The drum performs a half revolution at each operation and on the stopping of the drum the finished milled peg is ejected from one carriage guide and at the same time a fresh unworked peg blank is inserted in the second carriage guide.

An embodiment of the invention is illustrated by way of example in the accompanying drawings in which:—

Fig. 1 shows the machine in longitudinal section.

Fig. 2 is a top plan view of the machine.

Fig. 3 is a vertical section.

Fig. 4 shows in partial longitudinal section a modified construction of the tool.

Fig. 5 is a cross section of Fig. 4.

The peg blank $a$, one arm of which is to be provided on the inner side with a raised curved surface $b$ and the other with a cavity $c$ (Fig. 3), are carried by a drum $d$, on which two carriage guides $f, f'$ for accommodating the peg blank, are arranged eccentrically to the drum axle $e$, which blanks are conveyed during the rotation of the drum past a coned milling cutter $g$ revolving above the drum axle, which cutter has the shape of the peg slot and is provided with straight or spiral shaped teeth, so that, as the peg blank is passing by, it mills the raised curved surface $b$ on one peg arm and the cavity $c$ in the other. In order to protect the drum $d$ against vibration during the working of the cutter $g$, it may be carried by a bearing $h$ of suitable construction (Fig. 1). A spur wheel $i$ is fixed on the drum $d$ and meshes with a spur wheel $i'$ of like size (Fig. 3), which is only provided with teeth on one half of its circumference, so that the drum $d$ performs a half revolution during each complete revolution of the spur wheel $i'$ and remains stationary until the teeth of the wheel $i'$ again engage in the spur wheel $i$. Whilst the drum $d$ is at rest, the ejection of the finished peg $a'$ from the carriage guide $f$ and the insertion of a fresh peg blank in the carriage guide $f'$ is effected in the directions of the arrows shown in Fig. 2. The inserting of the peg blanks $a$, which are fed to the drum $d$, piled one upon the other (Fig. 1), is effected by a ram $j$ and the ejection of the finished pegs by a ram $j'$ (Fig. 2). Both rams are guided by rods $k, k'$, which are acted upon by pull springs $l, l'$. Under the rods $k, k'$ racks $m, m'$ are fixed in which pinions $n, n'$ engage, which are provided with teeth on half their periphery. As soon as the teeth of the pinions $n, n'$ engage in the racks $m, m'$ the rams $j, j'$ are shifted in the direction of the arrows and the pull springs $l, l'$ tensioned, so that the rods $k, k'$ are pulled back with the rams $j, j'$ into their initial position by the springs $l, l'$ as soon as the toothed portion of the wheels $n, n'$ releases the racks $m, m'$. The return thrust of the rods $k, k'$ can be damped by buffer springs. The rods $k, k'$ are preferably guided in bearing sleeves $o, o'$, whereas the rams $j, j'$ are guided in the bearings $e'$ of the drum axle $e$.

The peg blanks may also be guided in a straight path past the cutter $q$, the working of the pegs being then effected by the rotary cutter.

If the guiding of the peg blanks to the tool is not to be effected automatically, the simplified device, shown in Figs. 4 and 5, may be employed, but this slows down the work. The tool employed therefor consists of a conical drum, composed of two parts $p, p'$, which are held together by a sleeve $q$ and a screw $r$. The drum terminates in a square $s$, which is clamped in the cheek of the driving mechanism, through which the drum is rotated. Two blades $t$ are inserted between the two drum parts $p, p'$ and held between same by pins $t'$, which engage in the abutting surfaces of the drum parts $p, p'$. The blades project beyond the circumference of the drum on the inner and outer side and their tapered shape corresponds to the cut out portion of the clothes peg. In order to cut the raised curved surface b and the cavity c, the peg blank a2 need only be fed positively against the edge of the drum up to a collar u of the drum, the blades t working the peg accordingly. The chips drop out through apertures w, formed in the drum. For producing the clothes pegs with this simplified tool, blanks a2 of rectangular cross section are made in the length of two pegs, which, after one peg has been cut, are reversed, in order to enable the other peg to be also worked in a similar manner, after which the peg blank is severed, in the middle in the direction shown by the dotted line v (Fig. 4).

I claim:—

In a machine for working clothes pegs, the combination of a drum, an axle carrying said drum, a rotary milling cutter arranged above said axle adapted to cut a raised curved surface on the inner side of one arm of the peg and a cavity in the other arm in a single operation, carriage guides arranged eccentrically on said drum adapted to accommodate the peg blanks and feed said blanks past said cutter, means for periodically stopping said drum after every half revolution and means for ejecting the finished milled pegs out of one of said carriage guides and for inserting a fresh peg blank in the other of said carriage guides.

In testimony whereof I affix my signature.

KARL PRÖNNECKE.